Figure 1:
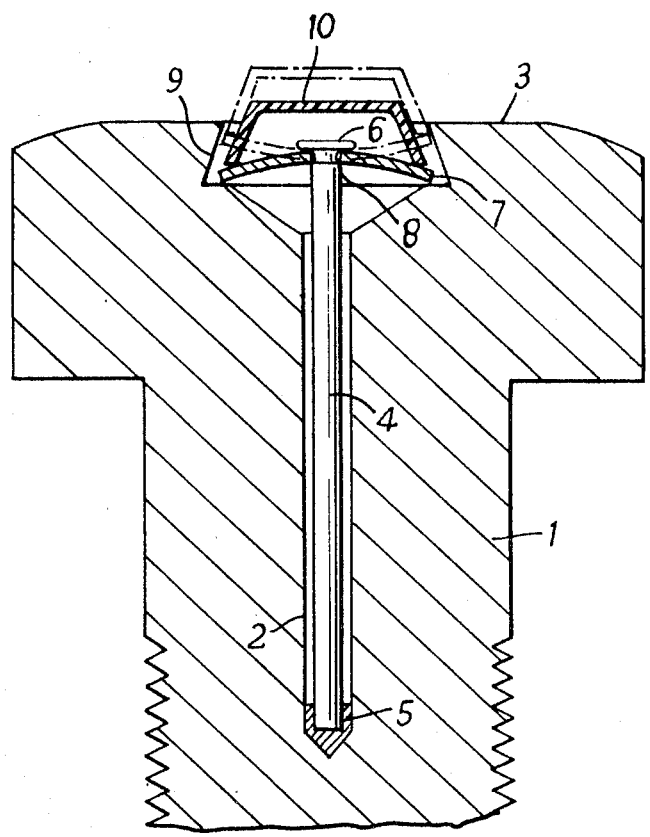

United States Patent

[11] 3,589,234

| [72] | Inventor | Jack Victor Haig Trigg<br>Queen's Road North Warnboroughs,<br>Odiham, Hampsire, England |
|---|---|---|
| [21] | Appl. No. | 827,422 |
| [22] | Filed | May 23, 1969 |
| [45] | Patented | June 29, 1971 |
| [32] | Priority | May 28, 1968 |
| [33] | | Great Britain |
| [31] | | 25497/68 |

[54] TENSILE MEMBER
6 Claims, 2 Drawing Figs.

| [52] | U.S. Cl. | 85/62 |
|---|---|---|
| [51] | Int. Cl. | F16b 31/02 |
| [50] | Field of Search | 85/1 T, 32 T, 61, 62 |

[56] References Cited
UNITED STATES PATENTS

| 1,774,695 | 9/1930 | Baynes | 85/62 |
|---|---|---|---|
| 2,413,797 | 1/1947 | Stone | 85/62 |
| 2,725,843 | 12/1955 | Koski | 85/62 |
| 2,747,454 | 5/1956 | Bowersett | 85/62 |
| 2,850,937 | 9/1958 | Ralston | 85/62 |
| 3,474,701 | 10/1969 | Setzler | 85/62 |

FOREIGN PATENTS

| 745,925 | 5/1944 | Germany | 85/62 |
|---|---|---|---|

Primary Examiner—Marion Parsons, Jr.
Attorney—Kemon, Palmer & Estabrook

ABSTRACT: A tensile member has a bore passing through one end, a pin passing through the bore secured at a point along its length to the tensile member and a disc spring connected to the pin and arranged to snap through when the pin is drawn into the bore by a predetermined amount.

PATENTED JUN29 1971 3,589,234

SHEET 1 OF 2

TENSILE MEMBER

The present invention relates to tensile members through which in use a tensile load is transmitted from one structure to another. Examples of such members are studs and bolts used for holding mating surfaces together.

It is known that the incidence of fatigue failure in such tensile members, when used for holding structure together under conditions in which the external load fluctuates, can be reduced by pretensioning the tensile member sufficiently to ensure that contact is maintained between the structures at all times. Any further pretensioning merely raises the mean load without reducing the fluctuating load in the tensile member.

Before the present invention the pretensioning could be achieved by torque wrenching, but this method has the disadvantage that special equipment is required, and variations in friction can give unreliable results. Tensile members are known which have parts which deform plastically when the correct pretension is reached, but such tensile members have the disadvantage that the deformed parts must be replaced before the tensile member can be used again.

According to the present invention there is provided a tensile member having a bore therein, a pin secured in the bore and a resilient member arranged between the pin and the tensile member and adapted to snap through a position of unstable equilibrium when the tensile member is elongated by a given amount. Preferably the resilient member is at the entrance to the bore.

When the tensile member according to the present invention is tightened in use it extends in proportion to the tension applied and the pin moves inwards relative to the entrance of the bore and pulls in the resilient member. The pin and resilient member can be set so that the resilient member snaps through its position of unstable equilibrium when the elongation of the tensile member is that corresponding to the desired pretension. When the resilient member snaps through it gives an audible click which indicates that the desired pretension has been reached. In order to facilitate assembly, the pin may be provided with a member the position of which can be adjusted linearly along the pin, the resilient member being connected to the linearly adjustable member.

In an especially advantageous embodiment of the present invention, a cap conveniently of plastics material or pressed metal, is loosely retained at the entrance of the bore, the cap being arranged to be pushed outwards by the resilient member when snapped through its position of unstable equilibrium. By pressing on the cap with the finger it can be determined whether the tensile member is being kept at the correct tension in use, a resilient reaction to pressure on the cap and a click given as a result of the resilient member being deflected to its original shape indicating that the correct tension is being maintained. When finger pressure is released the resilient member returns to its snapped-through position.

The resilient member may be in the form of a disc and the pin may be connected to the middle of the disc.

In a preferred form of the tensile member according to the present invention the periphery of the resilient member is seated loosely in the bottom of an aperture in the end of the tensile member. The walls of the aperture may be formed so as to loosely retain the cap, when provided, The cap, when provided serves to prevent dirt from entering the aperture.

In order to provide protection against moisture the aperture may be sealed over by an external flexible waterproof membrane, and the aperture may be filled with a water-repellant grease.

Two embodiments of the present invention will now be described by way of example only.

Figure 2:
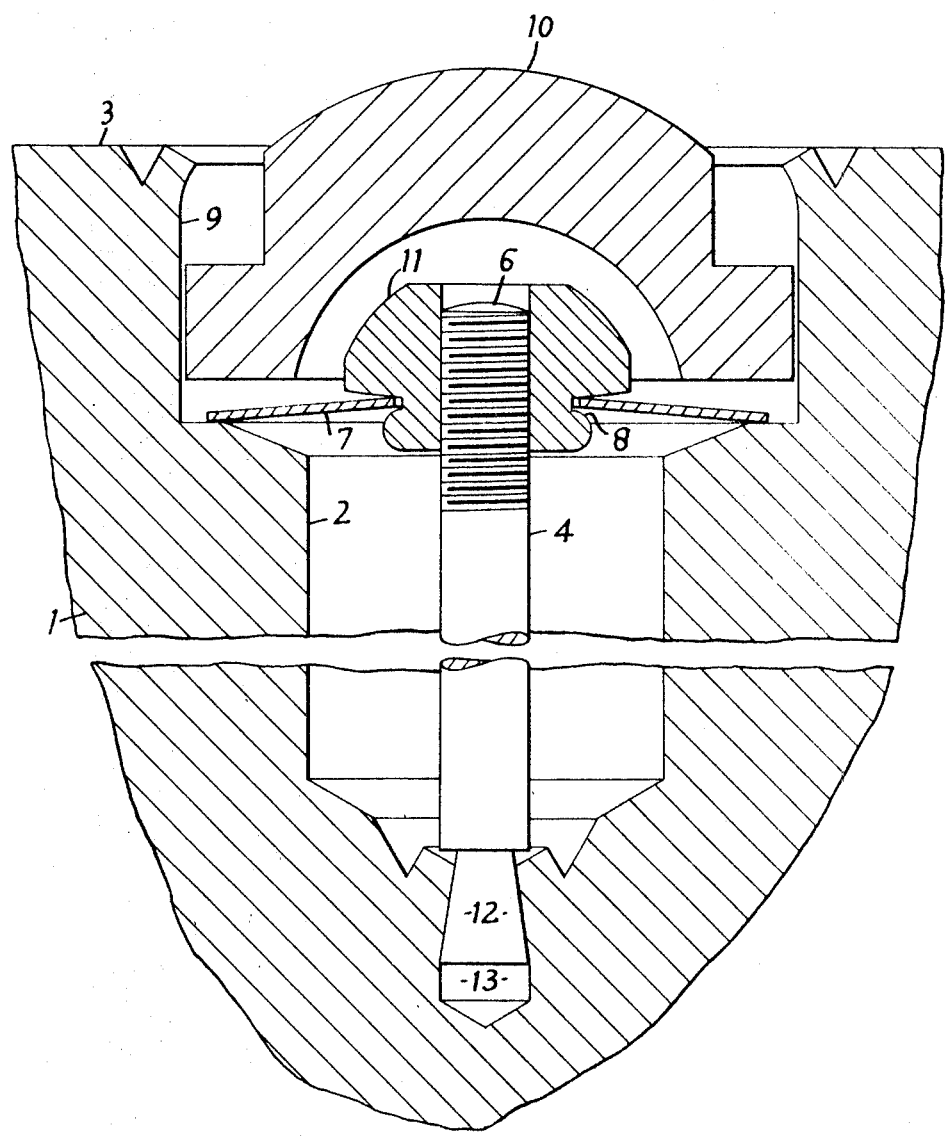

Reference will be made to the accompanying drawings in which:

FIG. 1 shows a longitudinal section through a tensile member in accordance with the invention, and FIG. 2 shows a longitudinal section through a tensile member in accordance with the invention in which the pin is threaded and provided with a nut the position of which can be adjusted along the pin.

In the following description elements which are similar in the two embodiments are referred to by the same numerals.

Referring to both figures, each of the tensile members 1 has a bore 2 passing through an end face 3 thereof. A pin 4, secured at one end to the end of the bore 2 retains at its other end 6 the middle of a tapering disc spring 7, of the sort usually known as a Belleville washer, against a circumferential shoulder 8. Elongation of the shank of the tensile member 1 causes the end 6 of the pin 4 to move inwards relative to the end face 3 and to deflect the disc spring 7 inwards. The taper of the disc spring 7 is exaggerated in the drawings. In practice the pin 4 and spring 7 would be set so that the disc spring 7 is almost flat, in which position a slight inward movement of the pin 4 corresponding to an elongation of the tensile member consequent upon the correct pre-tension being applied would cause the spring 7 to snap through into the position shown by broken lines in FIG. 1. The periphery of the disc spring 7 is seated in the bottom of an aperture 9, in the end face 3 of the tensile member.

In the case of the tensile member shown in FIG. 1 the end 6 of the pin 4 is spun over to retain the disc spring 7, while in the tensile member shown in FIG. 2 the end 6 of the pin is threaded to receive a threaded nut 11, the periphery of the underside of which is rivetted over to form the circumferential shoulder 8 which serves to retain the middle of the disc spring 7.

In the embodiment shown in FIG. 2 the side edges of the cap 10 are in sliding contact with the walls of the aperture 9 to prevent the ingress of dirt to the interior of the aperture 9, and the end 3 of the tensile member is deformed by ring-punching around the rim of the aperture 9 to provide a shoulder which serves to retain the edges cap 10 with the aperture 9.

In the embodiment shown in FIG. 1 the walls of the cap 10 taper inwardly in the direction away from the middle of the tensile member and the walls of the aperture 9 are correspondingly tapered so as to retain the cap 10.

The tensile member shown in FIG. 1 may be assembled by, for example, dropping a blob of solder, shown at 5 in FIG. 1, with flux into the bottom of the bore, heating the tensile member to melt the solder, and inserting the pin provided with the resilient member into the bore, sufficient pressure being applied to cause the resilient member to snap through, after which the pin is withdrawn by a predetermined distance, and the cap is placed into the aperture and depressed until the resilient member snaps through again and returns to its original position, the arrangement being such that an elongation of the tensile member consequent upon the desired pretension being applied will cause an inward movement of the pin sufficient to deflect the resilient member through its position of unstable equilibrium.

Instead of assembling the tensile member following calculation of the required position of the pin it is preferred to assemble the tensile member while in the prestressed condition. This method will now be described with reference to the embodiment shown in FIG. 2.

One end of the pin 4 is provided with a tapered portion 12 which is secured in secondary bore 13 at the closed end of the bore 2 by ring-punching around the rim of the secondary bore 13. The tensile member 1 is placed in a hydraulic jig and the desired pretension is applied. The nut 11, fitted with the disc spring 7 is then screwed carefully onto the threaded end 6 of the pin 4 until the disc spring 7 just snaps through and the position of the nut is fixed by applying a resin and allowing it to harden.

In use, when the disc spring 7 is in the snapped-through position, inward movement of the cap 10 under light finger pressure will be resiliently resisted. Application of sufficient finger pressure will cause the disc spring to deflect temporarily to its original shape. On release of finger pressure, the disc spring returns to its snapped through position, whereupon finger pressure will be once more resiliently resisted. Thus, the tensile member can be checked to determine whether the desired tension is being maintained in use by pressing on the cap with the finger. When the tension has fallen below the desired level the cap yields inwardly to finger pressure and pushes the spring back to its original position, shown in solid lines in the drawing, after which there is no resilient reaction to movement of the cap.

In the case in which the tensile member is provided with a cap over the resilient member, the tensile member according to the present invention can be used to detect an increase in the load applied. In this case the tensile member should be tightened to an extent which is insufficient to cause the resilient member to snap through. When the load in the tensile member becomes greater than that which the pin and resilient member are set to detect, there will be resilient reaction to movement of the cap under finger pressure.

The occurrence of fatigue failure in use of the tensile member of the present invention, when provided with a cap, can be detected by pressing on the cap with the finger. In the case in which fatigue failure, usually in the form of a transverse crack, occurs between the point of securement of the pin and the apertured end of the tensile member, the pin and resilient member are pulled inwards. In this case no click is given on pressing on the cap with the finger, since the resilient member is pulled inwards to such an extent that it cannot be snapped-through by finger pressure. In the case in which fatigue failure occurs between the point of securement of the pin and the end of the tensile member remote from the head of the pin, the elongation of the loaded part of the tensile member, and hence the pull on the pin and resilient member, is reduced. On pressing on the cap with the finger a click is given as the resilient member snaps through to its original shape, but thereafter there is no resilient reaction to finger pressure.

I claim:

1. In combination, a tensile member, a pin secured to said tensile member at a connecting point, said pin having a bearing surface remote from and facing towards said connecting point, a second bearing surface on said tensile member remote from and facing away from said connecting point, and a resilient member extending between and cooperable with said first and second bearing surfaces, said resilient member having two stable configurations and snapping through from one stable configuration to the other on predetermined distortion thereof.

2. The combination, according to claim 1, wherein said pin has an adjustable member disposed thereon, with means permitting linear adjustment of the position of said member along said pin, said adjustable member providing said first bearing surface.

3. The combination according to claim 1 in which said tensile member is bored and said pin is secured in said bore.

4. The combination according to claim 2 in which said resilient member is at the entrance to said bore.

5. The combination according to claim 1 including a cap loosely retained on said tensile member, said cap being disposed outwardly from said resilient member and having an inner surface, said resilient member contacting said inner surface when snapped through and pushing said cap outwards.

6. The combination according to claim 1 in which the resilient member has the form of a disc and said bearing surface bears on the middle of said disc.